United States Patent
Kyoya

[11] Patent Number: 5,949,939
[45] Date of Patent: Sep. 7, 1999

[54] LASER DIODE-LENS ALIGNMENT WITH 0.09 OR LESS NUMERICAL APERTURE

[75] Inventor: Shouichi Kyoya, Miyagi-ken, Japan

[73] Assignee: Alps Electric Co., Ltd., Tokyo, Japan

[21] Appl. No.: 08/795,721

[22] Filed: Feb. 4, 1997

[30] Foreign Application Priority Data

Feb. 7, 1996 [JP] Japan ................................ 8-021354

[51] Int. Cl.$^6$ ................................ G02B 6/32; G02B 6/42
[52] U.S. Cl. ................................ 385/93; 385/33
[58] Field of Search ................................ 385/88–94, 33–35

[56] References Cited

U.S. PATENT DOCUMENTS

| | | | |
|---|---|---|---|
| 5,077,819 | 12/1991 | Greil et al. | 385/79 |
| 5,087,109 | 2/1992 | Ishizuka et al. | 385/34 |
| 5,195,155 | 3/1993 | Shimaoka et al. | 385/88 X |
| 5,268,978 | 12/1993 | Po et al. | 385/89 X |
| 5,317,452 | 5/1994 | Prentiss et al. | 385/93 X |
| 5,351,330 | 9/1994 | Jongewaard | 385/93 |
| 5,436,990 | 7/1995 | Head et al. | 385/34 |
| 5,537,503 | 7/1996 | Tojo et al. | 385/93 |

*Primary Examiner*—John D. Lee
*Attorney, Agent, or Firm*—Brinks Hofer Gilson & Lione

[57] ABSTRACT

A light-emitting module includes a laser diode, a laser diode holder, a lens, and a lens barrel. The laser diode is supported by the laser diode holder, and both the lens 2 and the lens barrel are supported by the lens holder. The laser diode and the lens holder engage with each other to be fixed so that the optical axes of the laser diode and the lens agree with each other. The lens holder has an optical fiber fixed in the emergent direction. The lens holder further has an opening to set the numerical aperture for the lens to the laser diode to 0.09 or less.

3 Claims, 2 Drawing Sheets

LASER DIODE-LENS ALIGNMENT WITH 0.09 OR LESS NUMERICAL APERTURE

BACKGROUND OF THE INVENTION

1. Field of the Invention

The present invention relates to light-emitting modules for light communication, and in particular to a light-emitting module which is preferably used as a pig tail type in which an optical fiber is fixed.

2. Description of the Related Art

In a pig tail type of light-emitting module in which a laser diode, a lens and an optical fiber are incorporated, a laser beam emitted from the laser diode is converged by the lens and the laser beam converged by the lens and then optically coupled with the optical fiber. Such optical coupling requires not only essential accurate alignment in directions (X- and Y-directions) perpendicular to the optical direction of the laser beam in the optical fiber, but also accurate alignment in the direction (Z-direction) of the optical axis due to variations in the position of the laser diode chip when the chip is manufactured. Therefore, conventionally, the laser diode and the lens are aligned at first so as to be incorporated, and subsequently, the three components being the laser diode, the lens and the optical fiber are incorporated by adjusting the optical fiber in the X-, Y- and Z-directions.

However, according to the above conventional light-emitting module, the optical fiber must be tri-axially adjusted in the X-, Y- and Z-directions, which requires not only a complicated adjusting mechanism but also considerable time for adjustment. This greatly increases manufacturing cost. In general, a laser diode with a cap has various chip position shifts of approximately ±60 $\mu$m in the X-, Y- and Z-directions, thus, if adjustment in the Z-direction is omitted, coupling efficiency greatly deteriorates, which disadvantageously causes deterioration in performance of the light-emitting module.

SUMMARY OF THE INVENTION

Accordingly, in view of the above problems, it is an object of the present invention to provide a light-emitting module in which adjustment in the direction (Z-direction) of an optical axis can be omitted, regardless of variations in the position of a laser diode chip, thus reducing cost.

The foregoing object is achieved through the provision of a light-emitting module including a laser diode, and a lens for converging light emitted by the laser diode and for outputting the converged light to an optical fiber, the lens having a numerical aperture of 0.09 or less with respect to the laser diode.

To set a numerical aperture for the lens with respect to the laser diode to 0.09 or less, a convex shape may be formed on a portion of the lens, or a light-shielding layer may be formed on a surface of the lens. Above all, it is effective to utilize an opening in a lens holder for supporting the lens.

According to the present invention, the numerical aperture for the lens to the laser diode is set to a small value of 0.09 or less. Thus, the tolerance for variations in the laser diode chip is large, and only adjustment in the X- and Y-directions is required without adjustment in the direction of the optical axis of the optical fiber. Accordingly, a light-emitting module that requires simple adjustment and costs less is provided.

DESCRIPTION OF THE PREFERRED EMBODIMENT

By referring to the attached drawings, an embodiment of the present invention will be described.

Figure 1:
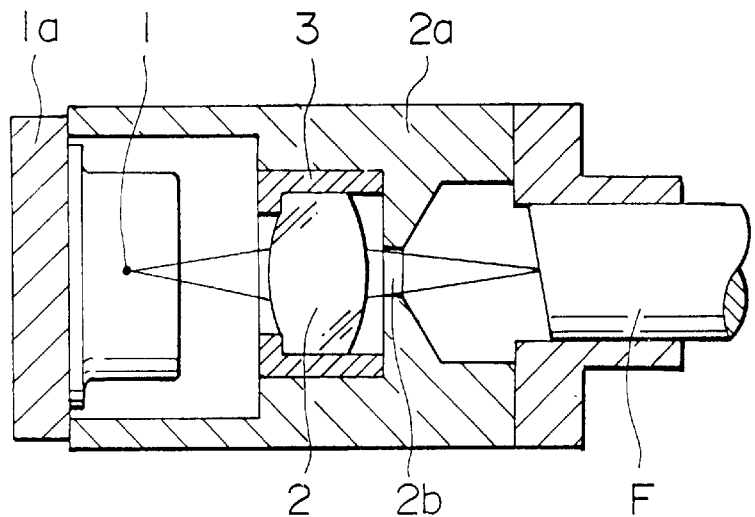
FIG. 1 is a cross-sectional view illustrating a light-emitting module according to an embodiment of the present invention.

FIG. 1 shows a pig tail type of light-emitting module in which a laser diode 1, a lens 2 and a fiber F are incorporated. The laser diode 1 is supported by a laser diode holder 1a, and both the lens 2 and a lens barrel 3 are supported by a lens holder 2a. The laser diode holder 1a and the lens holder 2a engage with each other so as to be fixed so that the optical axes of the laser diode 1 and the lens 2 agree, and the fiber F is fixed with respect to the emergent side of the lens holder 2a. In the lens holder 2a, an opening 2b for limiting a numerical aperture (hereinafter referred to as an "NA") for the lens 2 to the laser diode 1 is formed. This opening 2b is formed on the emergent side of the lens holder 2a and is in connection with the opening 2b, establishing the following relationship:

(NA for lens 2 to laser diode 1)=(NA for lens 2 to optical fiber F)×(Magnification)

Accordingly, the NA for the lens 2 to the laser diode 1 may be limited by an opening formed on the incident side of the lens holder 2a, with the relationship maintained. Otherwise, on a surface of the lens 2, a convex or a light-shielding layer may be formed to limit the NA for the lens 2 to the laser diode.

Figure 2:
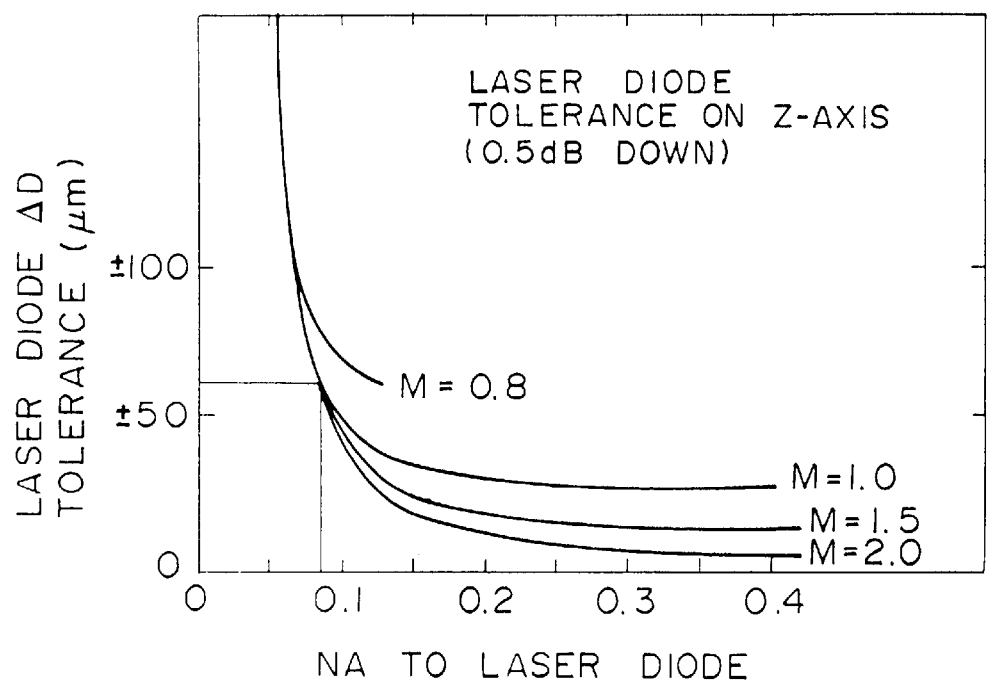
FIG. 2 is a graph showing the relationship between the numerical aperture for a lens to a laser diode and tolerance in the direction of the optical axis of the laser diode.

As described above, the position of the laser diode chip varies approximately ±60 $\mu$m in the X-, Y- and Z-directions. Thus, by setting a tolerance in the Z-direction for the laser diode 1, the lens 2 and the optical fiber F to ±60 $\mu$m or more, adjustment in the Z-direction can be omitted. FIG. 2 shows tolerances in the Z-direction for the laser diode 1 with respect to the NA for the lens 2 to the laser diode 1, which are obtained at magnifications M=0.8, 1.0, 1.5 and 2.0 when an allowable decrease in the quantity of output light is 0.5 dB. Apparently from FIG. 2, a decrease (ΔD) in the NA for the lens 2 to the laser diode 1 causes an increase in tolerance in the Z-direction of the laser diode 1, regardless of the magnification M. Also, by setting the NA for the lens 2 to the laser diode 1 to 0.09 or less with the opening 2b, the tolerance in the Z-direction increases to ±60 $\mu$m or more, thus, adjustment in the Z-direction can be omitted.

Figure 3:
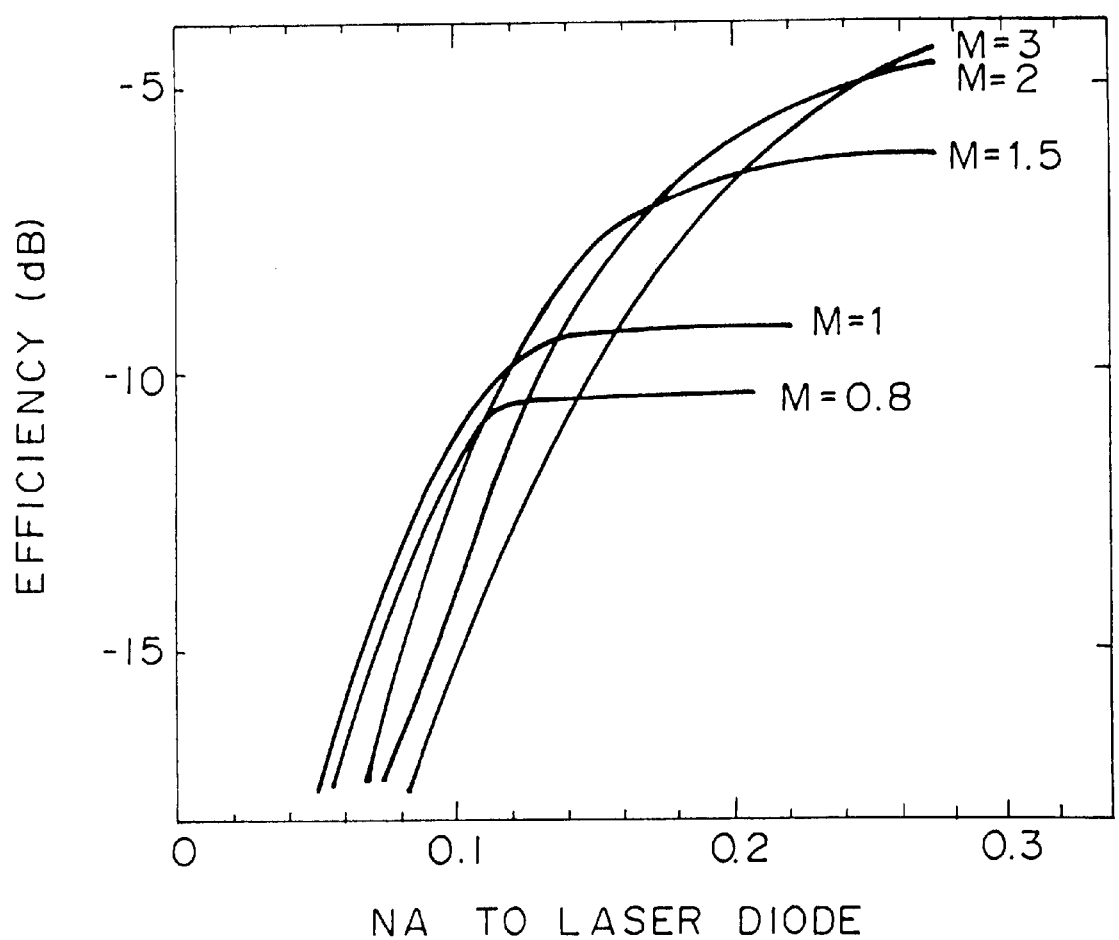
FIG. 3 is a graph showing the relationship between the numerical aperture for the lens to the laser diode and coupling efficiency.

FIG. 3 shows coupling efficiencies with respect to the NA for the lens 2 to the laser diode 1 at the magnifications M=3, 2, 1, 1.5, and 0.8, which are obtained when the laser diode 1 has a full width half maximum of 30° at a divergent angle. Apparently from FIG. 3, a decrease in the NA for the lens 2 to the laser diode 1 decreases the coupling efficiency, which can be used as a characteristic of a relatively low efficient light-emitting module. In addition, by using the laser diode 1 with a smaller divergent angle, an intermediately efficient light-emitting module is realized.

In the foregoing embodiment an example of a pig tail type of light-emitting module in which the optical fiber F is fixed has been described, however, the present invention can be applied to a receptacle type of light-emitting module in which the optical fiber F is removally fixed.

What is claimed is:

1. A light-emitting module, including:

a laser diode;

a lens for converging light emitted by said laser diode; and an optical fiber for receiving the converged light along an optical axis;

said lens being disposed between said laser diode and said optical fiber and having a numerical aperture of 0.09 or less with respect to said laser diode whereby adjustment of said laser diode in a Z-direction of the optical axis can be omitted.

2. A light-emitting module according to claim 1, further including a lens holder for supporting said lens, wherein an opening formed in said lens holder limits the light emitted by said laser diode, thereby setting the numerical aperture for said lens with respect to said laser diode to 0.09 or less.

3. A light-emitting module system, including:

a laser diode;

a lens having an optical axis; and an optical fiber positioned on said optical axis, said laser diode having a variable position over tolerances of approximately ±60 $\mu$m in the X-, Y-, and Z-directions, and said lens being disposed between said laser diode and said optical fiber and having a numerical aperture of 0.09 or less to said laser diode whereby due to the tolerance in the Z-direction, adjustment of said laser diode in the Z-direction can be omitted and only adjustment of said laser diode in the X- and Y-directions is required.

* * * * *